United States Patent
Zerr et al.

(10) Patent No.: US 11,122,318 B2
(45) Date of Patent: *Sep. 14, 2021

(54) METHODS AND SYSTEMS FOR IMPLEMENTING LEGACY REMOTE AND KEYSTROKE REDIRECTION

(71) Applicant: SONIFI Solutions, Inc., Sioux Falls, SD (US)

(72) Inventors: Derin Michael Zerr, Kahului, HI (US); Joel Walter Zdepski, Mountain View, CA (US); Christopher Paul Wollmann, Sioux Falls, SD (US); Shaun Eugene Marko, Oak Park, IL (US); Daniel A. Dirks, Vancouver, WA (US); Joshua H. Pulford, Sioux Falls, SD (US)

(73) Assignee: SONIFI Solutions, Inc., Sioux Falls, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/781,238

(22) Filed: Feb. 4, 2020

(65) Prior Publication Data

US 2020/0228858 A1 Jul. 16, 2020

Related U.S. Application Data

(63) Continuation of application No. 15/853,221, filed on Dec. 22, 2017, now Pat. No. 10,602,212.
(Continued)

(51) Int. Cl.
*H04N 21/43* (2011.01)
*H04N 21/41* (2011.01)
(Continued)

(52) U.S. Cl.
CPC ..... *H04N 21/4126* (2013.01); *H04N 21/2393* (2013.01); *H04N 21/42204* (2013.01);
(Continued)

(58) Field of Classification Search
None
See application file for complete search history.

(56) References Cited

U.S. PATENT DOCUMENTS

| | | |
|---|---|---|
| 4,198,870 A | 4/1980 | Barker et al. |
| 4,564,732 A | 1/1986 | Lancaster et al. |

(Continued)

FOREIGN PATENT DOCUMENTS

| | | |
|---|---|---|
| CA | 2788573 | 11/2012 |
| CA | 2790354 | 3/2013 |

(Continued)

OTHER PUBLICATIONS

U.S. Appl. No. 13/243,491, filed Sep. 23, 2011 now U.S. Pat. No. 9,107,055.
(Continued)

*Primary Examiner* — Cai Y Chen
(74) *Attorney, Agent, or Firm* — Sheridan Ross P.C.

(57) ABSTRACT

Methods and systems for routing key commands received from a remote-control device are provided. The method and/or system may include receiving, at a device, a key command from the remote-control device, generating a first message that includes the key command, sending, from the device, the first message to a keystroke router, and determining, at the keystroke router, a system network controller associated with the device. Moreover, the keystroke router may send the key command to the system network controller.

20 Claims, 10 Drawing Sheets

Related U.S. Application Data

(60) Provisional application No. 62/438,236, filed on Dec. 22, 2016.

(51) Int. Cl.
| | |
|---|---|
| *H04N 21/6587* | (2011.01) |
| *H04N 21/422* | (2011.01) |
| *H04N 21/437* | (2011.01) |
| *H04N 21/239* | (2011.01) |
| *H04N 21/4363* | (2011.01) |
| *H04N 21/61* | (2011.01) |

(52) U.S. Cl.
CPC ....... *H04N 21/437* (2013.01); *H04N 21/6587* (2013.01); *H04N 21/43635* (2013.01); *H04N 21/43637* (2013.01); *H04N 21/6125* (2013.01)

(56) References Cited

U.S. PATENT DOCUMENTS

| | | |
|---|---|---|
| 5,374,952 A | 12/1994 | Flohr |
| 5,455,619 A | 10/1995 | Truckenmiller et al. |
| 5,506,572 A | 4/1996 | Hills et al. |
| 5,641,319 A | 6/1997 | Stoel et al. |
| 5,675,828 A | 10/1997 | Stoel et al. |
| 5,905,942 A | 5/1999 | Stoel et al. |
| 5,907,715 A | 5/1999 | Stoel et al. |
| 5,990,885 A | 11/1999 | Gopinath |
| 6,226,677 B1 | 5/2001 | Slemmer |
| 6,240,533 B1 | 5/2001 | Slemmer |
| 6,343,315 B1 | 1/2002 | Stoel et al. |
| 6,377,990 B1 | 4/2002 | Slemmer et al. |
| 6,594,692 B1 | 7/2003 | Reisman |
| 7,251,329 B2 | 7/2007 | Ikonen et al. |
| 7,272,844 B1 | 9/2007 | Bankers et al. |
| 7,380,031 B2 | 5/2008 | Jones et al. |
| 7,444,663 B2 | 10/2008 | Fenwick, Jr. et al. |
| 7,895,630 B2 | 2/2011 | McKenna et al. |
| 7,930,721 B1 | 4/2011 | Hernes |
| 7,971,782 B1 | 7/2011 | Shams |
| 8,214,429 B2 | 7/2012 | Chidel et al. |
| 8,250,612 B2 | 8/2012 | Kim et al. |
| 8,272,561 B2 | 9/2012 | Shin et al. |
| 8,356,251 B2 | 1/2013 | Strober |
| 8,370,879 B2 | 2/2013 | Zerr et al. |
| 8,374,127 B2 | 2/2013 | Woo et al. |
| 8,434,111 B2 | 4/2013 | Levy et al. |
| 8,490,127 B2 | 7/2013 | Vantalon et al. |
| 8,539,524 B2 | 9/2013 | Woo et al. |
| 8,572,662 B2 | 10/2013 | Cassidy et al. |
| 8,578,418 B2 | 11/2013 | Levy et al. |
| 8,655,345 B2 | 2/2014 | Gold |
| 8,713,612 B2 | 4/2014 | Levy et al. |
| 8,732,753 B2 | 5/2014 | Warrick |
| 8,854,195 B2 | 10/2014 | West et al. |
| 8,855,622 B2 | 10/2014 | Gold |
| 8,903,978 B2 | 12/2014 | Zerr et al. |
| 9,003,455 B2 | 4/2015 | Hulse et al. |
| 9,032,451 B2 | 5/2015 | Cansino et al. |
| 9,060,011 B2 | 6/2015 | Gold |
| 9,060,197 B2 | 6/2015 | Warick et al. |
| 9,107,055 B2 | 8/2015 | Zerr et al. |
| 9,326,095 B2 | 4/2016 | Yu et al. |
| 9,369,829 B2 | 6/2016 | Zerr et al. |
| 9,602,864 B2 | 3/2017 | Cholas et al. |
| 9,787,756 B2 | 10/2017 | Gold |
| 9,854,388 B2 | 12/2017 | Zerr et al. |
| 9,942,304 B2 | 4/2018 | Gold |
| 10,244,375 B2 | 3/2019 | Zerr et al. |
| 10,291,956 B2 | 5/2019 | Zdepski et al. |
| 10,326,823 B2 | 6/2019 | Gold |
| 10,327,035 B2 | 6/2019 | Zerr et al. |
| 10,602,212 B2 | 3/2020 | Zerr et al. |
| 10,631,042 B2 | 4/2020 | Zerr et al. |
| 10,743,075 B2 | 8/2020 | Zerr et al. |
| 2002/0052965 A1 | 5/2002 | Dowling |
| 2003/0071792 A1* | 4/2003 | Safadi ................. H04N 21/426 345/169 |
| 2003/0090386 A1 | 5/2003 | Giraldin et al. |
| 2003/0202006 A1 | 10/2003 | Callway |
| 2003/0229900 A1 | 12/2003 | Reisman |
| 2004/0261110 A1* | 12/2004 | Kolbeck ................. H04N 7/20 725/78 |
| 2005/0283791 A1 | 12/2005 | McCarthy et al. |
| 2006/0107299 A1 | 5/2006 | Bartfeld et al. |
| 2006/0117379 A1 | 6/2006 | Bennett et al. |
| 2006/0123053 A1 | 6/2006 | Scannell, Jr. |
| 2006/0153122 A1 | 7/2006 | Hinman et al. |
| 2006/0277312 A1 | 12/2006 | Hirsch |
| 2007/0080934 A1 | 4/2007 | Chen et al. |
| 2007/0155326 A1 | 7/2007 | Lin et al. |
| 2007/0157281 A1 | 7/2007 | Ellis et al. |
| 2008/0060081 A1 | 3/2008 | Van Den Heuvel |
| 2008/0130595 A1 | 6/2008 | Abdel-Kader |
| 2008/0141313 A1 | 6/2008 | Kato et al. |
| 2008/0151847 A1 | 6/2008 | Abujbara |
| 2008/0168129 A1 | 7/2008 | Robbin et al. |
| 2008/0207170 A1 | 8/2008 | Khetawat et al. |
| 2009/0007240 A1 | 1/2009 | Vantalon et al. |
| 2009/0083824 A1 | 3/2009 | McCarthy et al. |
| 2009/0102983 A1 | 4/2009 | Malone et al. |
| 2009/0125971 A1 | 5/2009 | Belz et al. |
| 2009/0144815 A1 | 6/2009 | Vrielink et al. |
| 2009/0158404 A1 | 6/2009 | Hahn et al. |
| 2009/0172780 A1 | 7/2009 | Sukeda et al. |
| 2009/0180614 A1 | 7/2009 | Rajagopal et al. |
| 2009/0320055 A1 | 12/2009 | Langille et al. |
| 2010/0058485 A1 | 3/2010 | Gonzalez et al. |
| 2010/0069115 A1 | 3/2010 | Liu |
| 2010/0070997 A1 | 3/2010 | Friedman |
| 2010/0145859 A1 | 6/2010 | Murakami et al. |
| 2010/0162294 A1 | 6/2010 | Yin et al. |
| 2010/0165879 A1 | 7/2010 | Gupta et al. |
| 2010/0176919 A1 | 7/2010 | Myers et al. |
| 2010/0278345 A1 | 11/2010 | Alsina et al. |
| 2010/0330979 A1 | 12/2010 | Harris |
| 2011/0099598 A1 | 4/2011 | Shin et al. |
| 2011/0116452 A1 | 5/2011 | Welch et al. |
| 2011/0167486 A1 | 7/2011 | Ayloo et al. |
| 2011/0244829 A1 | 10/2011 | Kase |
| 2011/0290893 A1 | 12/2011 | Steinberg |
| 2011/0295502 A1 | 12/2011 | Faenger |
| 2011/0302607 A1 | 12/2011 | Warrick et al. |
| 2011/0314497 A1 | 12/2011 | Warrick et al. |
| 2012/0027374 A1 | 2/2012 | Lipkind |
| 2012/0072951 A1 | 3/2012 | King |
| 2012/0075538 A1 | 3/2012 | Okuda |
| 2012/0096503 A1 | 4/2012 | Slothouber et al. |
| 2012/0159472 A1 | 6/2012 | Hong et al. |
| 2012/0159538 A1 | 6/2012 | Phillips et al. |
| 2012/0166628 A1 | 6/2012 | Kullos |
| 2012/0166655 A1 | 6/2012 | Maddali et al. |
| 2012/0243444 A1 | 9/2012 | Hillier et al. |
| 2012/0249890 A1 | 10/2012 | Chardon et al. |
| 2012/0260268 A1 | 10/2012 | Mirkin |
| 2012/0272147 A1 | 10/2012 | Strober |
| 2013/0051237 A1 | 2/2013 | Ong |
| 2013/0081093 A1 | 3/2013 | Cassidy et al. |
| 2013/0091309 A1 | 4/2013 | Bjontegard et al. |
| 2013/0097286 A1 | 4/2013 | Robbin et al. |
| 2013/0124759 A1 | 5/2013 | Strober |
| 2013/0142181 A1 | 6/2013 | Makim et al. |
| 2013/0239199 A1 | 9/2013 | Ong |
| 2013/0297723 A1 | 11/2013 | Iwaniszyn |
| 2013/0298020 A1 | 11/2013 | Stoikos |
| 2013/0305320 A1 | 11/2013 | Warrick et al. |
| 2013/0305341 A1 | 11/2013 | Baker et al. |
| 2013/0339533 A1 | 12/2013 | Neerinex et al. |
| 2013/0339865 A1 | 12/2013 | Oslund et al. |
| 2013/0346564 A1 | 12/2013 | Warrick et al. |
| 2013/0346808 A1 | 12/2013 | Gyorffy |
| 2013/0347028 A1 | 12/2013 | Warrick et al. |
| 2014/0006474 A1 | 1/2014 | White et al. |
| 2014/0026162 A1 | 1/2014 | Cassidy et al. |

(56) References Cited

U.S. PATENT DOCUMENTS

| | | |
|---|---|---|
| 2014/0051362 A1 | 2/2014 | Ding |
| 2014/0053246 A1 | 2/2014 | Huang et al. |
| 2014/0053282 A1 | 2/2014 | Court |
| 2014/0067828 A1 | 3/2014 | Archibong et al. |
| 2014/0089524 A1 | 3/2014 | Carriere |
| 2014/0090030 A1 | 3/2014 | Ong |
| 2014/0114919 A1 | 4/2014 | Woods |
| 2014/0143380 A1 | 5/2014 | Warrick et al. |
| 2014/0150031 A1 | 5/2014 | Kumar et al. |
| 2014/0189758 A1 | 7/2014 | Kozlowski |
| 2014/0189759 A1 | 7/2014 | Warrick et al. |
| 2014/0245395 A1 | 8/2014 | Hulse et al. |
| 2014/0250460 A1 | 9/2014 | Hulse et al. |
| 2014/0250470 A1 | 9/2014 | Warrick |
| 2014/0282751 A1 | 9/2014 | Lee et al. |
| 2014/0282921 A1 | 9/2014 | Filman et al. |
| 2014/0289410 A1 | 9/2014 | Smith et al. |
| 2014/0304722 A1 | 10/2014 | Ostlund |
| 2014/0331135 A1 | 11/2014 | Sukoff et al. |
| 2014/0347181 A1 | 11/2014 | Luna et al. |
| 2015/0089222 A1 | 3/2015 | White et al. |
| 2015/0147972 A1 | 5/2015 | Motto |
| 2015/0254726 A1 | 9/2015 | Cassidy et al. |
| 2015/0334245 A1 | 11/2015 | Lin et al. |
| 2015/0339274 A1 | 11/2015 | Pappu et al. |
| 2015/0350690 A1 | 12/2015 | Zerr et al. |
| 2015/0365512 A1 | 12/2015 | MacKenzi et al. |
| 2015/0373123 A1 | 12/2015 | Warrick et al. |
| 2015/0373401 A1 | 12/2015 | Kwon et al. |
| 2015/0382195 A1 | 12/2015 | Grim et al. |
| 2016/0027399 A1 | 1/2016 | Wilde et al. |
| 2016/0073440 A1 | 3/2016 | Palten et al. |
| 2016/0192191 A1 | 6/2016 | Lee et al. |
| 2016/0249158 A1 | 8/2016 | Tredoux et al. |
| 2016/0285877 A1 | 9/2016 | Anderson et al. |
| 2016/0323433 A1 | 11/2016 | Anderson et al. |
| 2017/0206593 A1 | 7/2017 | Zolotov |
| 2017/0229009 A1 | 8/2017 | Foster et al. |
| 2018/0121150 A1 | 5/2018 | Lin et al. |
| 2019/0297134 A1 | 9/2019 | Gold |
| 2020/0228863 A1 | 7/2020 | Zerr et al. |

FOREIGN PATENT DOCUMENTS

| | | |
|---|---|---|
| CA | 2817932 | 12/2013 |
| CA | 2820654 | 12/2013 |
| CN | 203590374 | 5/2014 |
| EP | 0094839 | 11/1983 |
| WO | WO 2007/002604 | 1/2007 |
| WO | WO 2009/137247 | 11/2009 |
| WO | WO 2012/145227 | 10/2012 |

OTHER PUBLICATIONS

U.S. Appl. No. 13/488,809, filed Jun. 5, 2012 now U.S. Pat. No. 8,903,978.
U.S. Appl. No. 14/486,888, filed Sep. 15, 2014 now U.S. Pat. No. 9,369,829.
U.S. Appl. No. 15/152,243, filed May 11, 2016 now U.S. Pat. No. 9,854,388.
U.S. Appl. No. 15/812,652, filed Nov. 14, 2017 now U.S. Pat. No. 10,244,375.
U.S. Appl. No. 14/503,858, filed Oct. 1, 2014.
U.S. Appl. No. 14/728,831, filed Jun. 2, 2015.
U.S. Appl. No. 15/144,492, filed May 2, 2016.
U.S. Appl. No. 15/082,064, filed Mar. 28, 2016.
U.S. Appl. No. 15/282,556, filed Sep. 30, 2016 now U.S. Pat. No. 10,631,042.
U.S. Appl. No. 15/282,676, filed Sep. 30, 2016 now U.S. Pat. No. 10,291,956.
U.S. Appl. No. 16/828,660, filed Mar. 24, 2020.
U.S. Appl. No. 15/459,394, filed Mar. 15, 2017 now U.S. Pat. No. 10,327,035.
U.S. Appl. No. 16/418,763, filed May 21, 2019 now U.S. Pat. No. 10,743,075.
U.S. Appl. No. 16/912,817, filed Jun. 26, 2020.
U.S. Appl. No. 15/853,221, filed Dec. 22, 2017 now U.S. Pat. No. 10,602,212.
"Commercial Requirements for Companion Screen in the DVB-GEM Specification," DVB Organization, Apr. 2013, Version R 6.9.1, 40 pages.
"Dial Discovery and Launch protocol specification," Netflix, Inc., 2012, Version 1.6.4, 16 pages.
"DIAL: DIscovery And Launch protocol specification," Netflix, Inc., 2014, Version 1.7.2, 30 pages.
"Specification of the Bluetooth® System Version 4.2. Manual," Bluetooth SIG, Inc., Dec. 2014, 40 pages [retrieved on May 21, 2016 from https://www.bluetooth.com/specifications/adopted-specifications].
Erman et al. "Over the Top Video: The Gorilla in the Cellular Networks," IMC11, Nov. 24, 2011 [retrieved from the internet May 9, 2017 from URL: www.cs.columbia.edu/~lierranli/coms6998-7Spring2014/papers/videocellular_imc2011.pdf].
Montpetit et al. "IPTV: An End to End Perspective," Journal of Communications, May 2010, vol. 5, No. 5, pp. 358-373.
Xia et al. "A Survey on Software-Defined Networking," IEEE Communication Surveys & Tutorials, First Quarter 2015, vol. 17, No. 1, pp. 27-51.
International Search Report and Written Opinion for International (PCT) Patent Application No. PCT/US2016/030437, dated Sep. 7, 2016, 12 pages.
International Preliminary Report on Patentability for International (PCT) Patent Application No. PCT/US2016/030437, dated Nov. 16, 2017 9 pages.
Official Action for Canada Patent Application No. 2,983,161, dated Aug. 13, 2018 3 pages.
Extended Search Report for European Patent Application No. 16789899.8, dated Sep. 28, 2018 7 pages.
International Search Report and Written Opinion for International (PCT) Patent Application No. PCT/US17/68339, dated Mar. 26, 2018 8 pages.
International Preliminary Report on Patentability for International (PCT) Patent Application No. PCT/US2017/068339, dated Jun. 25, 2019 6 pages.
Official Action for U.S. Appl. No. 14/728,831, dated Feb. 25, 2016, 15 pages.
Official Action for U.S. Appl. No. 14/728,831, dated Oct. 6, 2016, 15 pages 15 pages.
Official Action for U.S. Appl. No. 14/728,831, dated Jul. 12, 2017, 19 pages.
Official Action for U.S. Appl. No. 14/728,831, dated Feb. 22, 2018 20 pages.
Official Action for U.S. Appl. No. 14/728,831, dated Dec. 28, 2018 21 pages.
Official Action with U.S. Appl. No. 15/853,221, dated Sep. 5, 2018 8 pages.
Official Action for U.S. Appl. No. 15/853,221, dated Feb. 14, 2019 9 pages.
Official Action for U.S. Appl. No. 15/853,221, dated Jun. 10, 2019 10 pages.
Notice of Allowance for U.S. Appl. No. 15/853,221, dated Nov. 4, 2019, 9 pages.
Extended Search Report for European Patent Application No. 17884682.0, dated Jun. 19, 2020 7 pages.

\* cited by examiner

METHODS AND SYSTEMS FOR IMPLEMENTING LEGACY REMOTE AND KEYSTROKE REDIRECTION

CROSS-REFERENCE TO RELATED APPLICATIONS

This application claims the benefit of U.S. patent application Ser. No. 15/853,221, filed Dec. 22, 2017, which claims priority to U.S. Provisional Patent Application Ser. No. 62/438,236, filed Dec. 22, 2016, the entire disclosures of which are each hereby incorporated herein by reference for all that it teaches and for all purposes.

FIELD

Systems and methods for routing and redirecting keystroke commands received from a remote control device are disclosed.

BACKGROUND

Increasingly, video entertainment, such as movies and television shows, is delivered to users on demand over digital networks. In addition, the distribution of content has expanded to include user devices, such as smartphones. These user devices have the ability to interface with content delivery systems and to output video and other content to users and various output devices. However, because of the need for mobility, the output capabilities of user devices are necessarily limited. Therefore, it is desirable to direct content streams associated with a user device to televisions or home theater systems.

In many hospitality settings, there is a desire to provide entertainment services to guests using applications and devices that are familiar to guests. However, making such entertainment services, such as Netflix®, available to guests while maintaining security and implementing device isolation has proved to be difficult. Moreover, there is often a desire to utilize components familiar to guests and further to implement such components in a commercial off-the-shelf configuration, where existing components are utilized in various hospitality settings and configurations. However, as access and control of media content displayed in hospitality settings becomes more of a combination of user-provided devices and content and hospitality operator-provided devices and content, there becomes a need to provide configurations where such devices operate together in a cohesive manner.

SUMMARY

Embodiments of the present disclosure are directed to systems and methods for receiving a key, or command, from a remote-control device and redirecting the received key, or command, to a system network controller. Within the context of a hospitality environment, where a guest room may include an output device, such as a television, and local player capable of supporting one or more streaming protocols, a system network controller may receive a first key value from a remote-control device or other device, and change the value of the key so that an application executing on the local player associated with an output device correctly registers the value, or meaning, of the received key. More specifically, and as a first non-limiting example, pressing an INFO button on a remote control may cause the remote control to send a key or command representative of the INFO button. A device generally associated with the remote control, such as a television, may receive the key or command representative of the INFO button and cause an information screen to be displayed at the television. However, where the remote is also to be used to control a local player for example, the local player may not have the necessary mapping to receive the specific key or command and cause an appropriate action to be performed.

For example, the local player, if capable, may receive the key or command associated with the INFO button; however, if an appropriate mapping is not established, the local player may not respond accordingly. Moreover, in instances where the communication medium of the remote control is incompatible with the local player, the local player cannot receive the key or command. In accordance embodiments of the present disclosure, the key or command may be redirected to a device that is compatible with the local player. Thus, the key or command representative of the INFO button for example, may change from a first value/character to a second value/character, such as a "?" or other character, by the system network controller so that the key can be natively digested by an application running on the local player. An up arrow may still be the equivalent of an up arrow, but might have a different representation code.

In accordance with an embodiment of the present disclosure, a method for routing key commands received from a remote-control device is provided. The method may include receiving, at a device, a key command from the remote-control device, generating a first message that includes the key command, sending, from the device, the first message to a keystroke router, and determining, at the keystroke router, a system network controller associated with the device. Moreover, the keystroke router may send the key command to the system network controller.

In accordance with another embodiment of the present disclosure, a communication system is provided. The communication system may include a local player, an output device configured to receive a key command from a remote-control device and to generate a first message that includes the key command, and a keystroke router configured to receive the first message from the output device, determine a system network controller associated with the output device, and send the key command to the system network controller.

In accordance with another embodiment of the present disclosure, a communication system is provided. The communication system may include a local player, a device configured to receive a key command from a remote-control device and to generate a first message that includes the key command, and a keystroke router configured to receive the first message from the output device, determine a system network controller associated with the output device, and send the key command to the system network controller.

Additional features and advantages of embodiments of the present disclosure will become more readily apparent from the following description, particularly when taken together with the accompanying drawings.

DETAILED DESCRIPTION

Figure 1A:
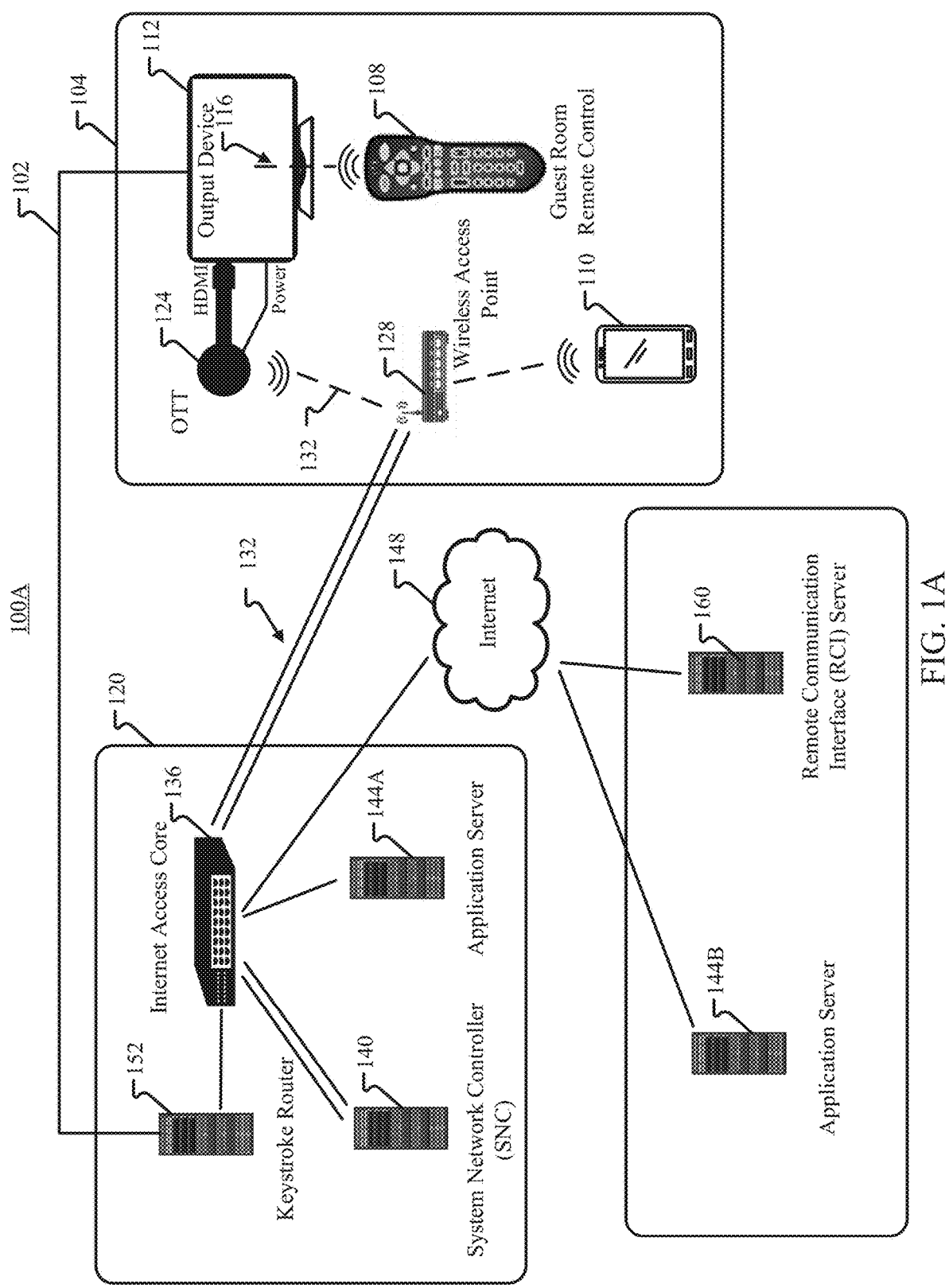
FIG. 1A is a first block diagram depicting components of a system in accordance with embodiments of the present disclosure.

FIG. 1A is a block diagram illustrating a system 100A for enabling connectivity in accordance with embodiments of the present disclosure. The system 100A is generally configured to operate in one or more hospitality environments, such as a guest room 104. The system 100A generally includes one or more guest remote-control devices 108 configured to interact with and/or control an output device 112. The output device 112 may be a television, monitor, or similar output device. The guest room remote control 108 generally controls or otherwise provides keystroke commands, also referred to as keys, to the output device 112 using any form of wireless communication 116. Such wireless communication 116 may include, but is not limited to, infrared and/or radio frequency user devices. The output device 112 may receive a key command from the guest room remote control 108 and communicate with a headend system 120. The headend system 120 may then provide content to the output device 112.

In some embodiments, the output device 112 may be in communication with a local player 124, such as a Chromecast device or other device capable of supporting one or more multimedia streaming sessions. The local player 124 may be connected to the output device 112 via an HDMI port. Power may be supplied to the local player 124 through a USB port associated with the output device 112. The USB port may be one that supplies power when the output device 112 is itself powered on, or can be configured to supply power continuously. In accordance with other embodiments, power may be supplied to the local player 124 through other means. For example, the local player 124 can be connected to a wall outlet providing power. Alternatively, or in addition, the local player 124 may reside within the output device 112. That is, the output device 112 may include the functionality of the local player 124. In accordance with embodiments of the present disclosure, the local player 124 may receive content, such as multimedia content, to be rendered or otherwise output to the output device 112 at the direction of the mobile device 110. Moreover, a pairing procedure may ensure security and sufficiently maintain device isolation such that the mobile device 110 is confined to or otherwise restricted from communicating with or accessing restricted hospitality devices and/or components that are inside and/or outside the guest room 104. That is, once paired, the mobile device 110 may communicate with authorized devices connected to the hospitality network. The local player 124, output device 112, and/or the mobile device 110 may be connected to a system network controller (SNC) 140 through a communication network 132 via a wireless access point 128. The SNC 140 may perform registration functions with respect to local players 124, output devices 112, mobile device 110, and other devices capable of providing content, such as multimedia content, to the output device 112. More particularly, the SNC 140 may maintain a table of information associating the local player 124 to the guest room 104, the mobile device 110 to the guest room 104, and/or the local player 124 to the mobile device 110.

In accordance with embodiments of the present disclosure, the system 100A may include various other devices and network nodes, located locally or remotely with respect to the output devices 112. For example, the local premises or hotel headend system 120 may be provided and may include the SNC 140 and a local area network switch, router, and/or Internet access core 136, which may be associated with a wireless or wireline (e.g., Ethernet) network or networks. As a further example, an application server 144 can be provided as part of the headend system 120 for hosting or otherwise making applications accessible to the local player 124. The headend system 120 may generally include a control center in an entertainment system where various signals are brought together and monitored before being introduced into the local entertainment network. The reference to headend system 120 is not limited to video entertainment providers, such as cable tv systems, but may also include various monitoring and control features associated with Internet access, wireless Internet access, output devices 112, local players 124, and other devices and services a guest of a hospitality establishment may use. Various other devices may be connected to the headend system 120 via the Internet 148. Examples of such systems include, but are not limited to, an application server 144B accessible by the local player 124.

An application on the local player 124 can be launched via a command from the SNC server 140 when the SNC server 140 detects that a local player 124 has powered up. A local player app or application, such as a default app at power up, communicates with the local SNC server 140 to get information regarding in what room and site the player app or application is installed. The information from the local SNC server 140 also contains the URL for an app, such as a second app, to launch. Once this information is retrieved, the currently executing app on the local player (the default app for instance) calls the specified URL and loads the requested application from a server. The URL for the requested application may point to the application server 144A, the application server 144B, the SNC 140 and/or another location having an accessible app, such as a receiver app, that runs on the local player 124. The SNC server 140 may use the room number and IP/MAC address of the user device 110 to create a pairing between the local player 124 in the guest room and the user device 110. In addition to providing convenient pairing of a user device 110 in the form of a smartphone, such embodiments also enable laptop computers, tablets, or other devices that may support casting through the chrome browser or other applications to an output device 112.

The local player 124 generally receives one or more commands from the guest mobile device 110 and/or the SNC 140; such commands may direct the local player 124 to one or more specific URLs or other locations where one or more receiver apps may be hosted. The local player 124 then renders, or executes, the receiver app located at the specified URL. In accordance with embodiments of the present disclosure, the local player 124 may be configured to render content consistent with one or more key commands from the guest remote-control 108. That is, both the mobile device 110 and the guest remote-control 108 may be used to control content accessed by the local player 124. Accordingly, and as depicted in at least FIG. 1A, the guest remote-control 108 may send a key command to the output device 112, where the output device 112 receives the key command and sends the command on to a keystroke router 152 via a broadband local area network (b-LAN) 102. The output device 112 may first generate a message including the received key or command, and then send the message including the receive key or command to the keystroke router 152. The keystroke router 152 may then determine an address associated with the key command origination (e.g., output device 112), determine which SNC 140 is associated with the particular output device 112, and send the message including key or command on to the associated SNC 140. If the SNC 140 is executing a sender app, the SNC 140 may communicate with the receiver app to update the app in accordance with the received key command from the remote control 108. That is, the SNC 140 may send the key, or a reformatted key, to an entity providing, or serving, the application to the Chromecast, such as the Application server 144B, the SNC 140 itself, and/or an external server. Alternatively, or in addition, the SNC 140 may provide the key, or a reformatted key, directly to the app running on the local player 124 (e.g., Chromecast device) via the network 132.

Figure 1B:
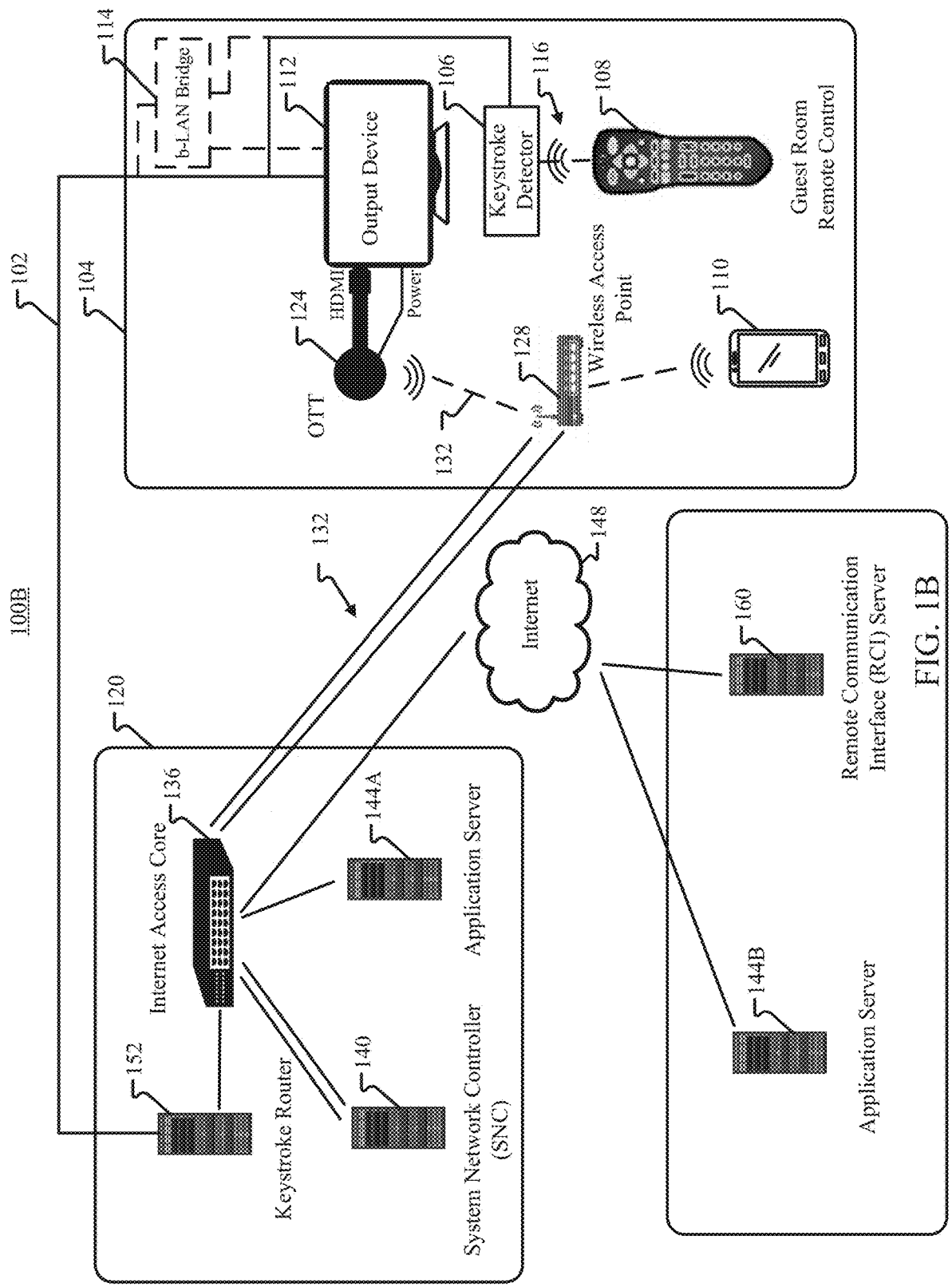
FIG. 1B is a second block diagram depicting components of a system in accordance with embodiments of the present disclosure.

FIG. 1B depicts a second system 100B in accordance with embodiments of the present disclosure. The second system 100B is the same as or similar to the first system 100A; however, the system 100B further includes a keystroke detector 106 and/or a b-LAN Bridge 114. Rather than, or in addition to, the output device 112 receiving the key from the guest room remote-control 108, the keystroke detector 106 may receive the key from the guest room-remote control 108 and communicate the received key to the keystroker router 152 over the b-LAN 102. The keystroke detector 106 may first generate a message including the received key or command, and then send the message including the receive key or command to the keystroke router 152. Alternatively, or in addition, the key may be routed via a b-LAN bridge 114; the b-LAN bridge 114 is a device that bridges a first communication network or connection, such as from the keystroke detector 106 and/or from the output device 112, to the b-LAN 102, such that devices not inherently capable of communicating via the b-LAN 102 may do so. Accordingly, a key may be received by the output device 112 and communicated to the keystroke router 152 via the b-LAN Bridge 114 and the b-LAN 102.

Figure 2A:
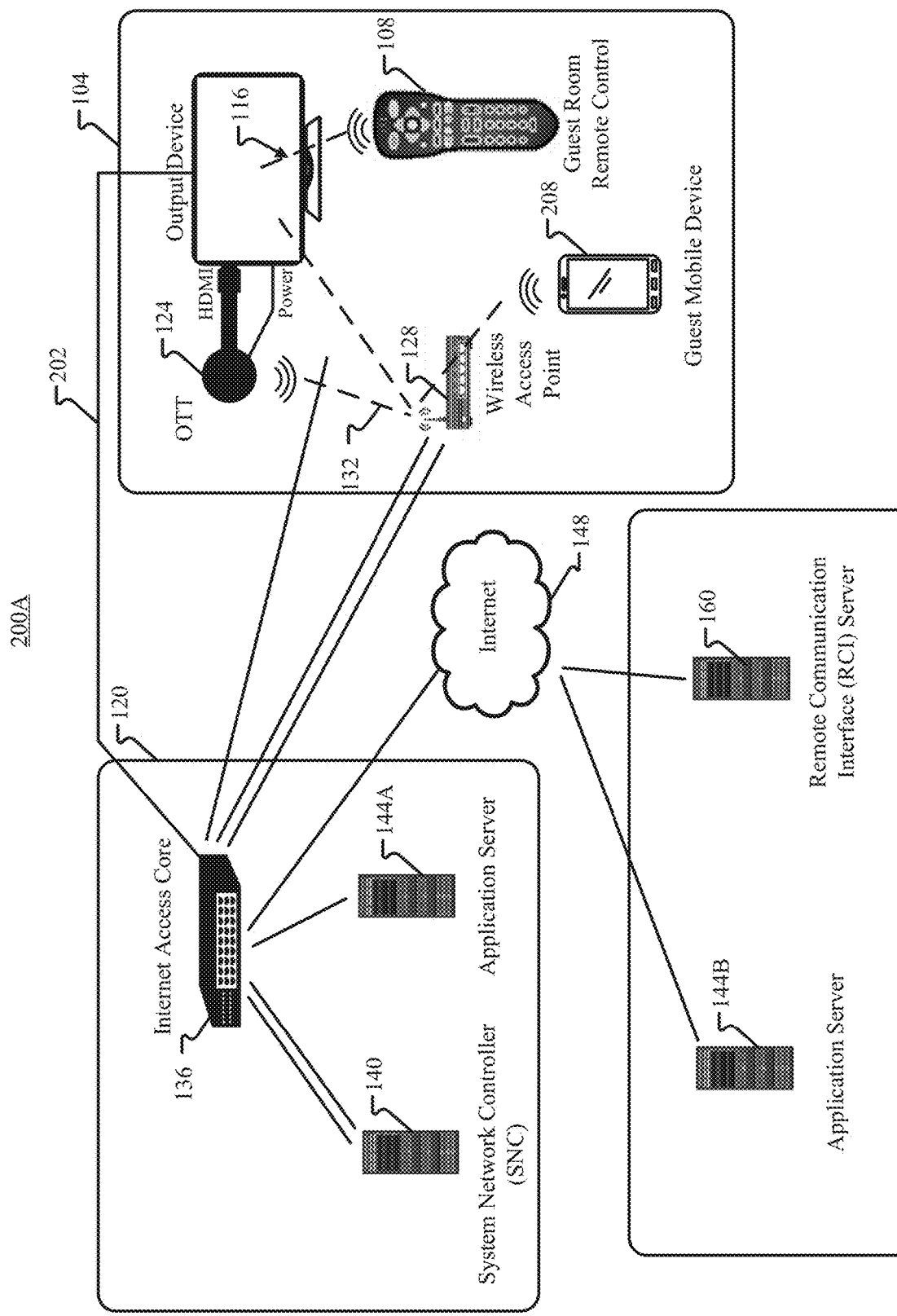
FIG. 2A is a third block diagram depicting components of a system in accordance with embodiments of the present disclosure.

FIG. 2A depicts a third system 200A in accordance with embodiments of the present disclosure. The third system 200A is the same as or similar to the first and second systems 100A and/or 100B; however, in the system 200A, the output device 112 receives a key from the guest room remote control 108 and forwards the key, or a reformatted key, to the SNC 140 via an Internet Protocol (IP) network 202. Accordingly, in such a system 200A, a keystroke router may not be needed since the key receiving device, for example the output device 112, may route the key, or a reformatted key, directly to the SNC 140. Accordingly, the guest remote control 108 may send a key command which is received by the output device 112. The output device 112 may receive the key, translate the key into a routable key message, and pass the key message to the SNC 140 via the network 132 and the Internet access core 136. The key message is received at the SNC 140, where the SNC 140 may then determine an address associated with the key command origination (e.g., output device 112). If the SNC 140 is executing a sender app, the SNC 140 may communicate with the receiver app to update the app in accordance with the received key command from the remote control 108. That is, the SNC 140 may send the key, or a reformatted key, to an entity providing, or serving, the application to the Chromecast, such as the Application server 144B, the SNC 140 itself, and/or an external server. Alternatively, or in addition, the SNC 140 may provide the key, or a reformatted key, directly to the app running on the local player 124 (e.g., Chromecast device) via the network 132.

Figure 2B:
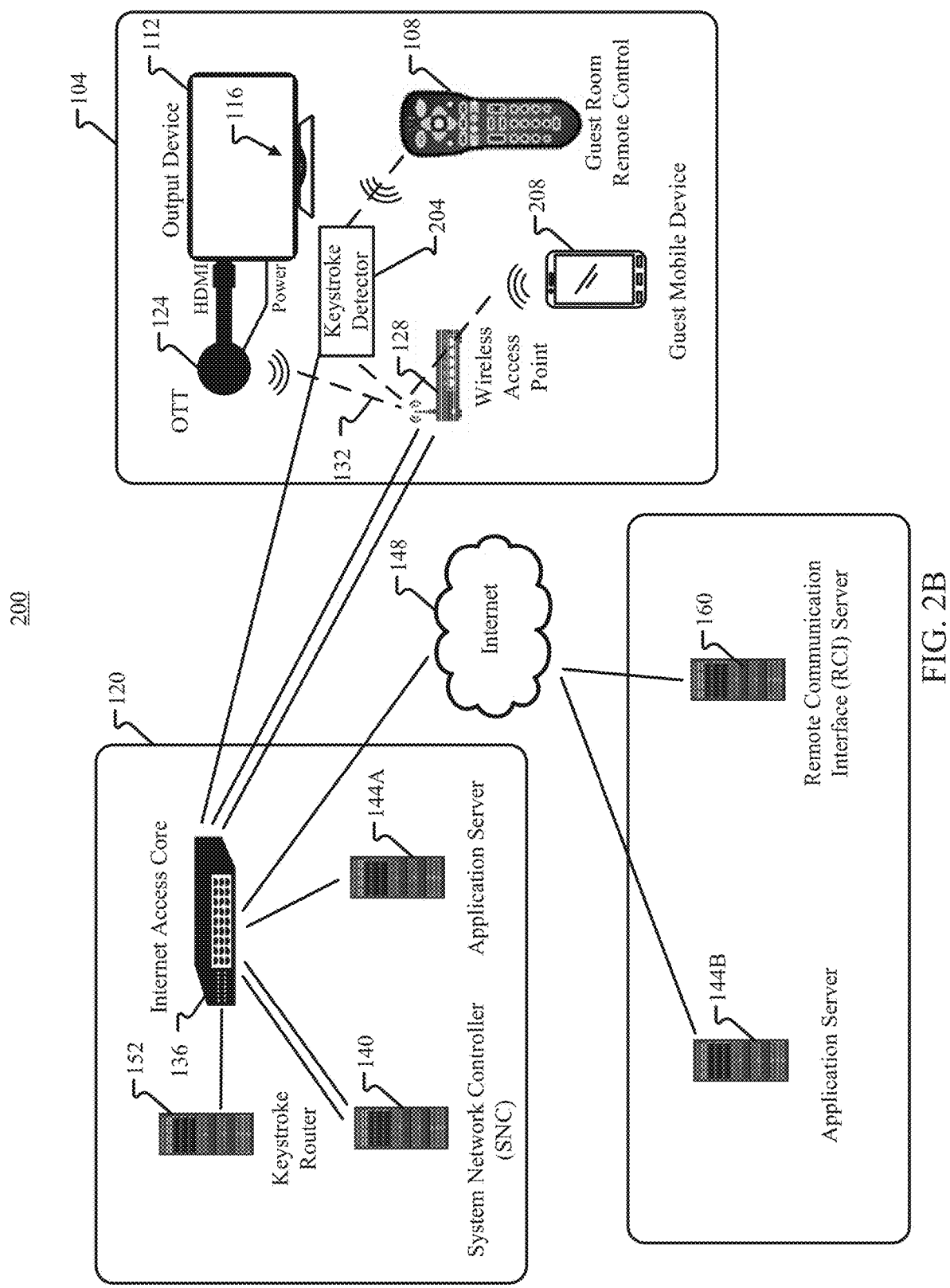
FIG. 2B is a fourth block diagram depicting components of a system in accordance with embodiments of the present disclosure.

FIG. 2B depicts a fourth system 200B in accordance with embodiments of the present disclosure. The fourth system 200B is the same as or similar to the first, second, and third systems 100A, 100B, and 200A; however, the system 200B further includes a keystroke detector 204 for directly receiving keystrokes from the guest room remote control 108. Accordingly, the guest remote control 108 may send a key command which is detected by the keystroke detector 204. The keystroke detector 204 may receive the keystroke, translate the keystroke into a routable keystroke message, and pass the keystroke message to the SNC 140 via the network 132 and the Internet access core 136. The keystroke message is received at the SNC 140 since that keystroke detector is likely communicating via IP rather than b-LAN, where the SNC 140 may then determine an address associated with the key command origination (e.g., keystroke detector 204). If the SNC 140 is executing a sender app, the SNC 140 may communicate with the receiver app to update the app in accordance with the received key command from the remote control 108. That is, the SNC 140 may send the key, or a reformatted key, to an entity providing, or serving, the application to the Chromecast, such as the Application server 144B, the SNC 140 itself, and/or an external server. Alternatively, or in addition, the SNC 140 may provide the key, or a reformatted key, directly to the app running on the local player 124 (e.g., Chromecast device) via the network 132.

In accordance with at least one embodiment of the present disclosure, the guest mobile device 208 may run an application having the ability to route key codes over the network 132 to the Internet access core 136 and directly to the SNC 140. Alternatively, or in addition, the guest mobile device 208 may run an application having the ability to route key codes over the network 132 to the Internet access core 136 and out to an external server. Accordingly, an external server (RCI 160 for example) would send the key code to the SNC 140 in a manner previously discussed.

Figure 3A:
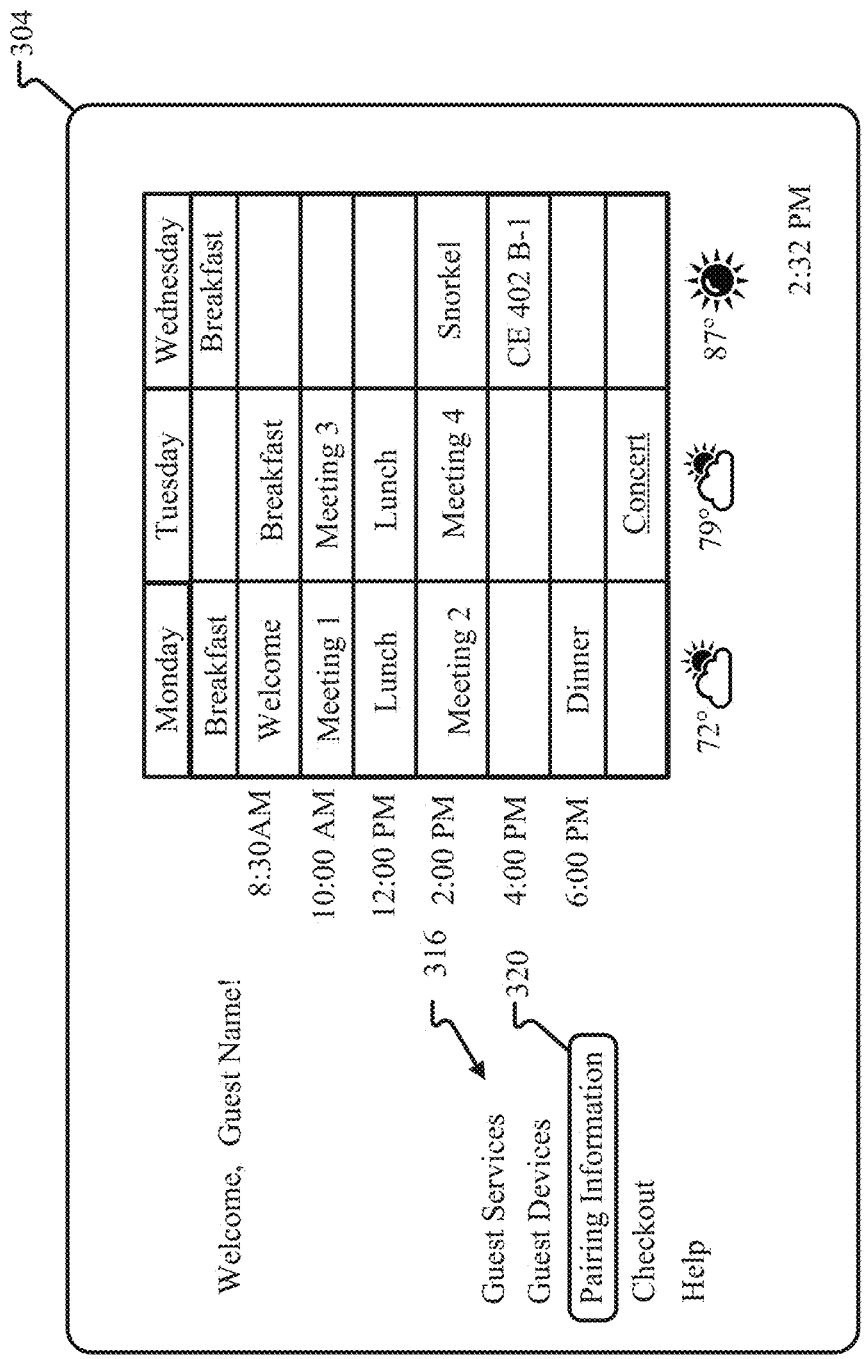
FIGS. 3A-3B depict an example display in accordance with embodiments of the present disclosure.
Figure 3B:
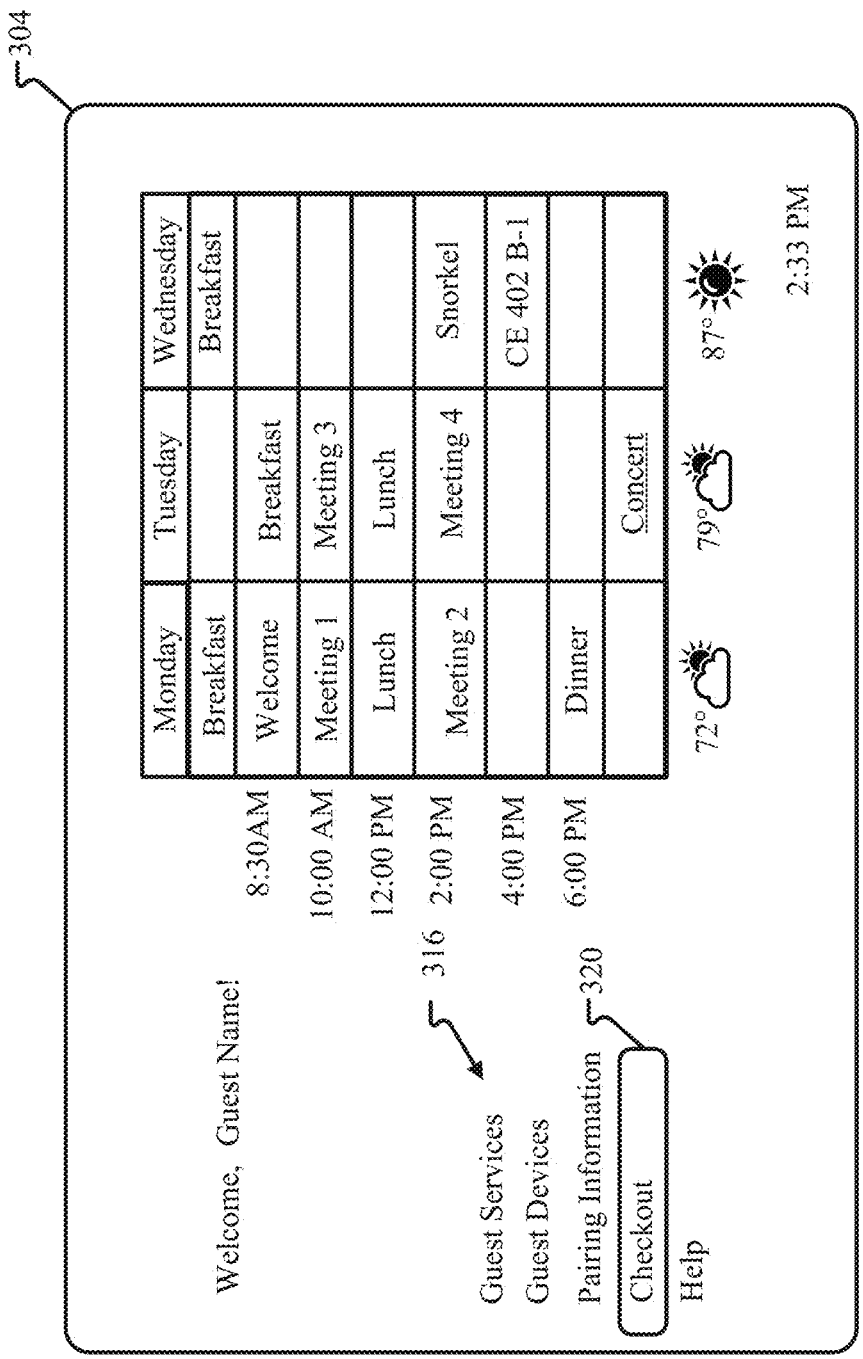

FIG. 3A depicts an example display 304 including content provided from the local player 124 and output to the output device 112 in accordance with embodiments of the present disclosure. As depicted in FIG. 3A, the display 304 may include guest-related content, such as guest name, schedule, and weather for example. The display 304 may also include one or more user-selectable items 316, such as, but not limited to, Guest Services, Guest Devices, Pairing Information, Checkout, and Help for example. In accordance with embodiments of the present disclosure, if a user desired to interact with the display 304, to move the selection box 320 from "Pairing Information" to "Checkout," as displayed in FIG. 3B, the user would select a down arrow on the guest remote control 108. The down arrow keystroke would then be detected by the output device 112 as depicted in FIGS. 1A and 2A and/or by the keystroke detector 106/204 as depicted in FIGS. 1B and 2B. The output device 112 and/or the keystroke detector 106 may send the received keystroke to the keystroke router 152 via the b-lan 102. Alternatively, or in addition, the output device 112 and/or the keystroke detector 204 may send the received keystroke to the SNC 140 via the network 132 and the Internet access core 136. The keystroke router 152, when needed, may then route the keystroke to the SNC 140 and/or another appropriate device. For example, the keystroke router 152 may route the keystroke to another device running the sender app. The SNC 140 and/or the other device may receive the keystroke and cause the receiver app running on the local player 124 to update accordingly. Thus, a guest is able to interact with the local player 124 using a guest room remote control 108.

Figure 4:
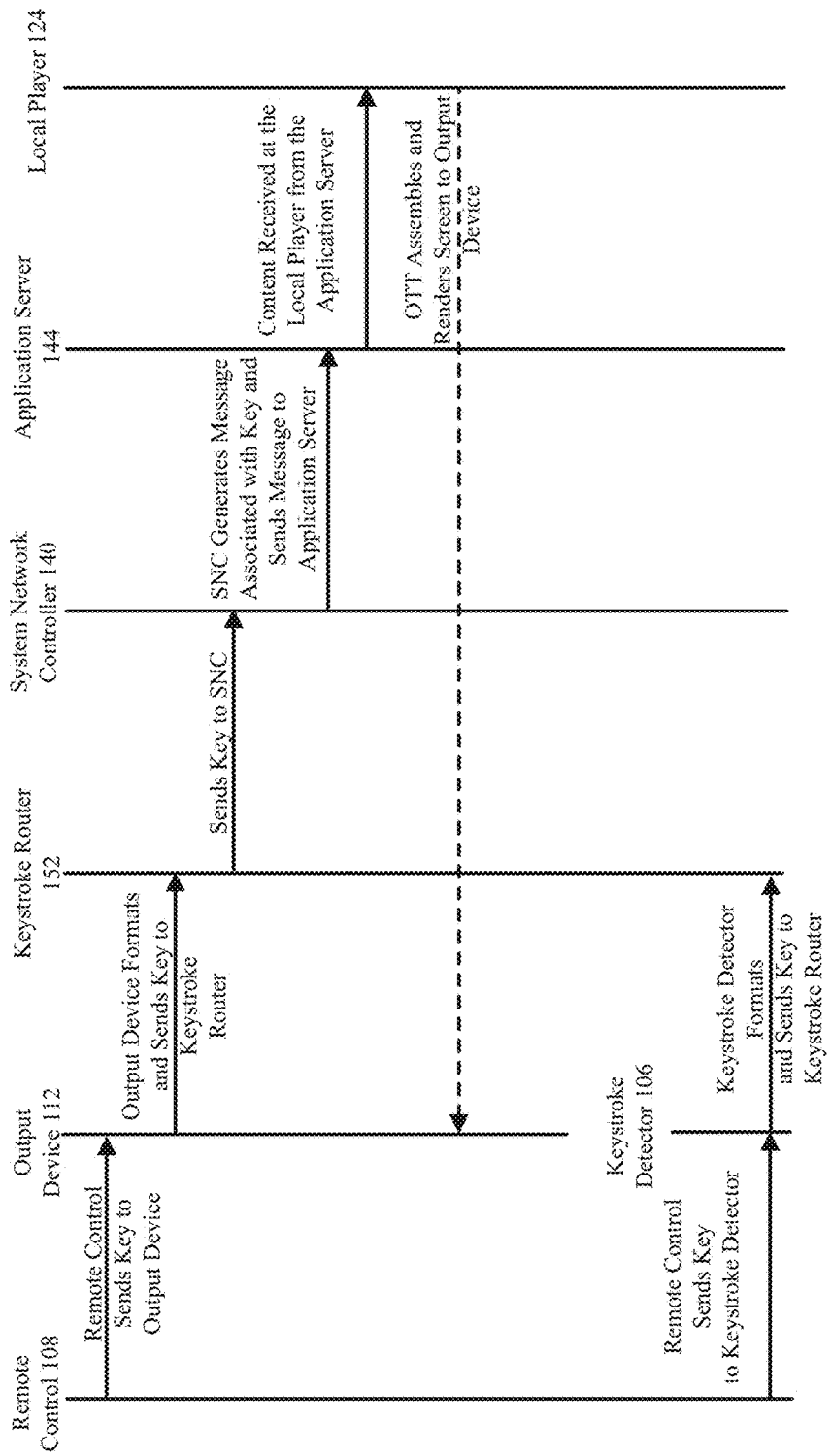
FIG. 4 depicts a first flow diagram in accordance with embodiments of the present disclosure.

FIG. 4 depicts aspects of the operation of the system 100A and/or 200A for utilizing a guest remote control 108 to control an application running on a local player 124 in accordance with embodiments of the present disclosure. That is, FIG. 4 generally illustrates a messaging flow diagram. Initially, a guest may depress a key on a remote control 108 such that the remote control 108 provides a key, or keystroke, to the output device 112 and/or keystroke detector 106. The output device 112 and/or keystroke detector 106 may format the received key and transmit such received key to the keystroke router 152 via a b-LAN 102 via a message. The keystroke router 152 may then send the key to an SNC 140 via another message, where the SNC 140 may interact with an application server 144; the application server 144 may then update the receiver app running on the local player 124 such that the change indicated by the key depressed by the user is depicted at the output device 112.

Figure 5:
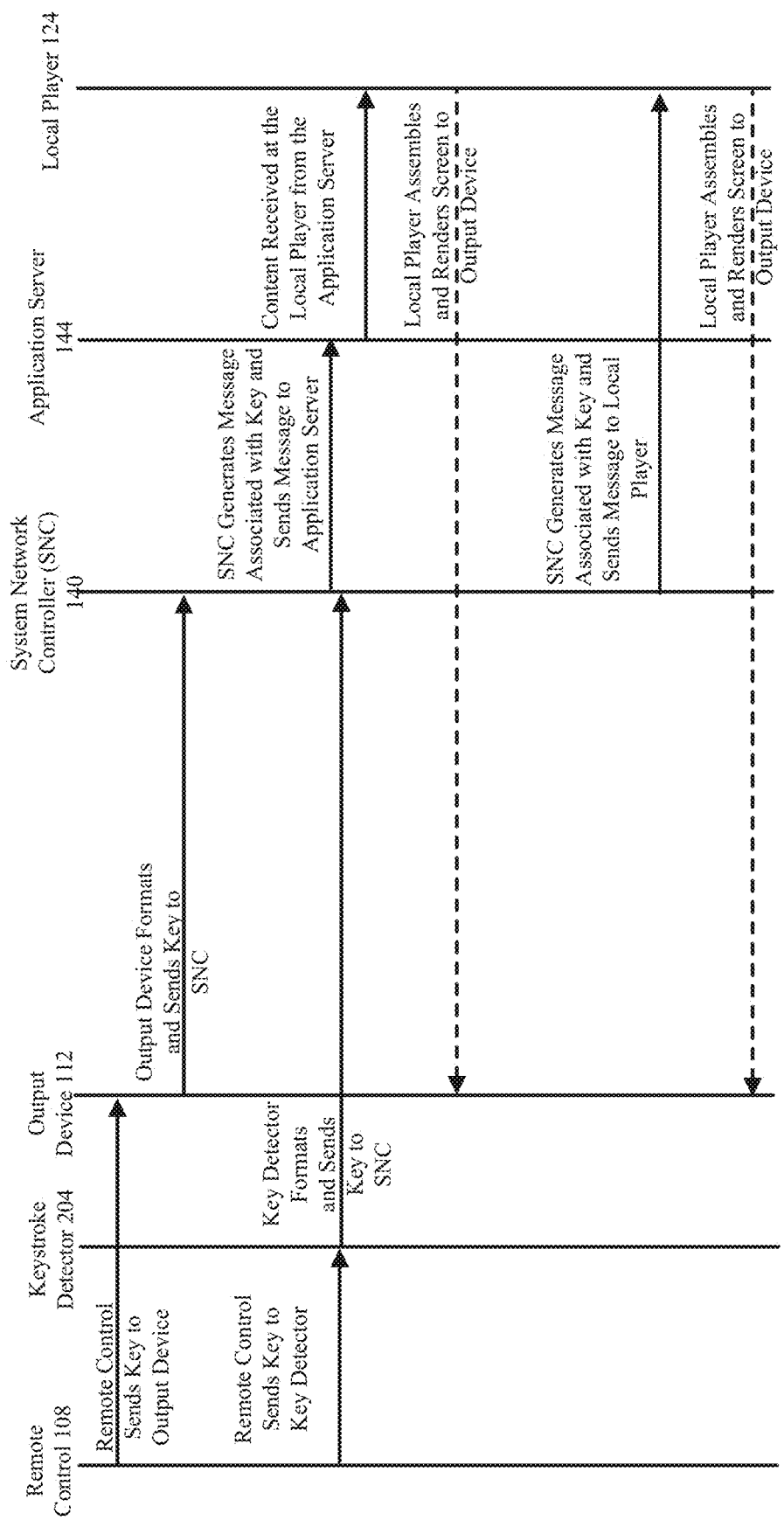
FIG. 5 depicts a second flow diagram in accordance with embodiments of the present disclosure.

FIG. 5 depicts aspects of the operation of the system 100B and/or 200B for utilizing a guest remote control 108 to control an application running on a local player 124 in accordance with embodiments of the present disclosure. That is, FIG. 5 generally illustrates a messaging flow diagram. Initially, a guest may depress a key on a remote control 108 such that the remote control 108 provides a key, or keystroke, to the output device 112 and/or to the keystroke detector 204. The output device 112 may format the received key and transmit such received key via a message to the SNC 140 via the communication network 132, such as an IP network. Alternatively, or in addition, the keystroke detector 204 may format the received key and transmit the received key in a message to the SNC 140 via the communication network 132. The SNC 140 may interact with an application server 144; the application server 144 may then update the receiver app running on the local player 124 such that the change indicated by the key depressed by the user is respectively represented at the output device 112. Alternatively, or in addition, the SNC 140 may directly interact with the local player 124 via one or more application programming interfaces such that the change indicated by the key depressed by the user is respectively represented at the output device 112.

Figure 6:
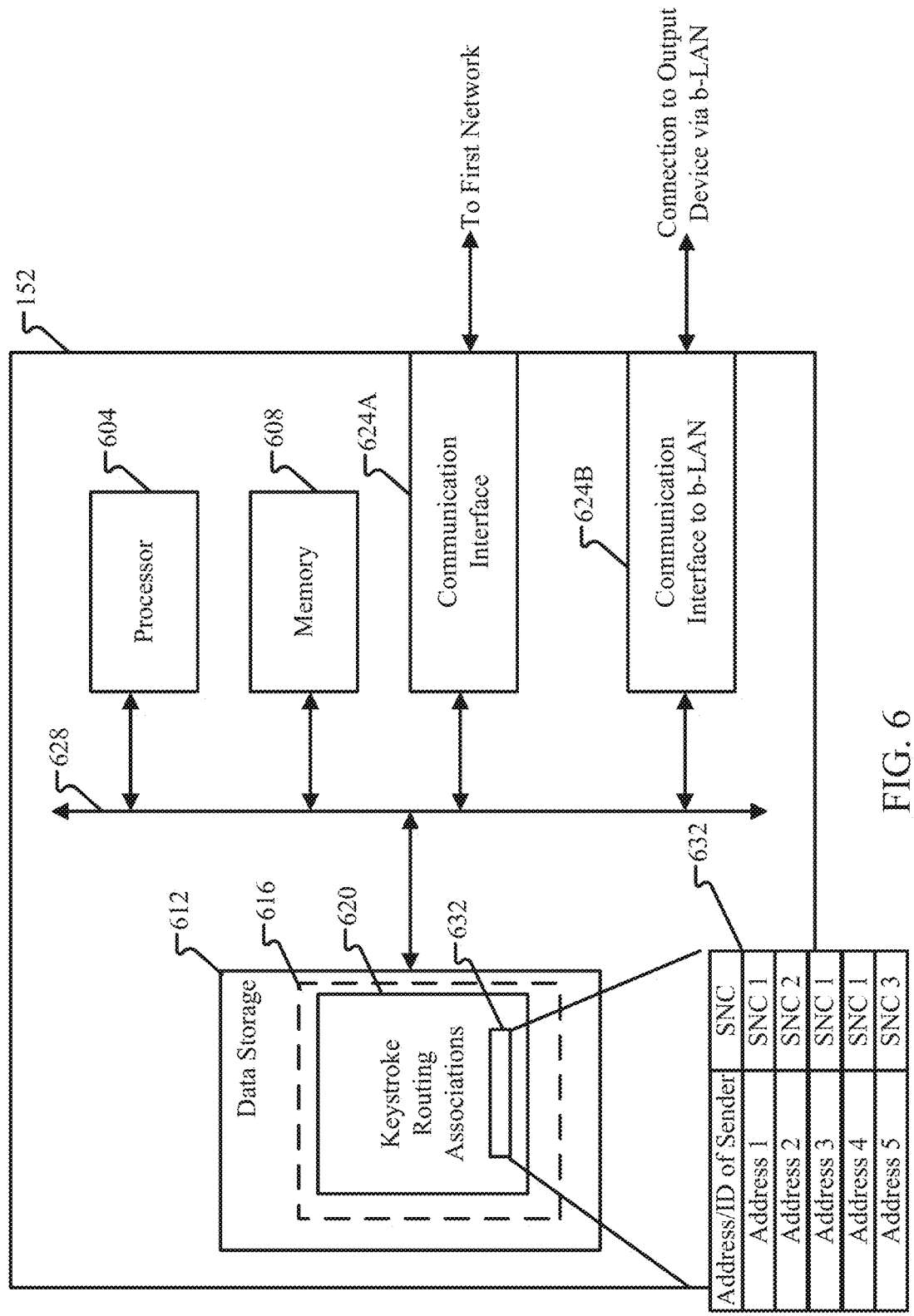
FIG. 6 depicts aspects of a keystroke router in accordance with embodiments of the present disclosure.

FIG. 6 is a block diagram illustrating components of a keystroke router 152 in accordance with embodiments of the present disclosure. In general, the keystroke router 152 includes a processor and memory. The processor may comprise a general purpose programmable processor or controller 604 for executing application programming or instructions. As a further example, the processor 604 may comprise a specially configured application specific integrated circuit (ASIC). The processor 604 generally functions to run programming code or instructions, such as applications or programs, implementing various functions of the keystroke router 152. The memory 608 is generally used in connection with the execution of application programming by the processor 604 and for the temporary or long-term storage of program instructions and/or data. As examples, the memory may comprise removable secure digital storage, RAM, SDRAM, or other solid-state memory.

The keystroke router 152 may include data storage 612. In accordance with embodiments of the present invention, data storage 612 may contain program code or instructions 616 implementing various applications or functions executed by the keystroke router 152. Like the memory 608, the data storage 612 may comprise a solid-state memory device. In addition, in certain applications, the data storage 612 can be integrated with and/or indistinguishable from the memory 608. Alternatively, or in addition, the data storage 612 may comprise a hard disk drive or other random access memory and/or can be interconnected to the keystroke router 152, for example as network-attached storage. Programming or modules stored in the data storage and executed by the processor 604 may include, as examples and without limitation, keystroke routing associations 620. That is, the keystroke routing associations 620 may associate an originating (or sending) address (or identifier), such as an IP address (or other identifier) of the output device 112 or keystroke detector 106, to an SNC 140. For example, a table 632, or other data association structure, may include the originating (or sending) address (or identifier), such as an IP address (or other identifier) of the output device 112 or keystroke detector 106, and an SNC 140. Of course additional fields may be included in the table 632. The keystroke router 152 may also include one or more communication interfaces 624A-B. For example, a first communication interface 624A may provide a connection to a first communication network, such as network 132, while the second communication interface 624B may provide a connection to the output device 112 via the b-LAN 102. One or more components for the keystroke router 152 may be coupled to and/or communication with one another via the bus 628.

The keystroke detector 106 may include the same or similar components as the keystroke router 152. That is, the keystroke detector 106 may include a processor, memory, one or more communication interfaces, and/or data storage and/or associations associating a received key or command to a respective keystroke router 152.

Figure 7:
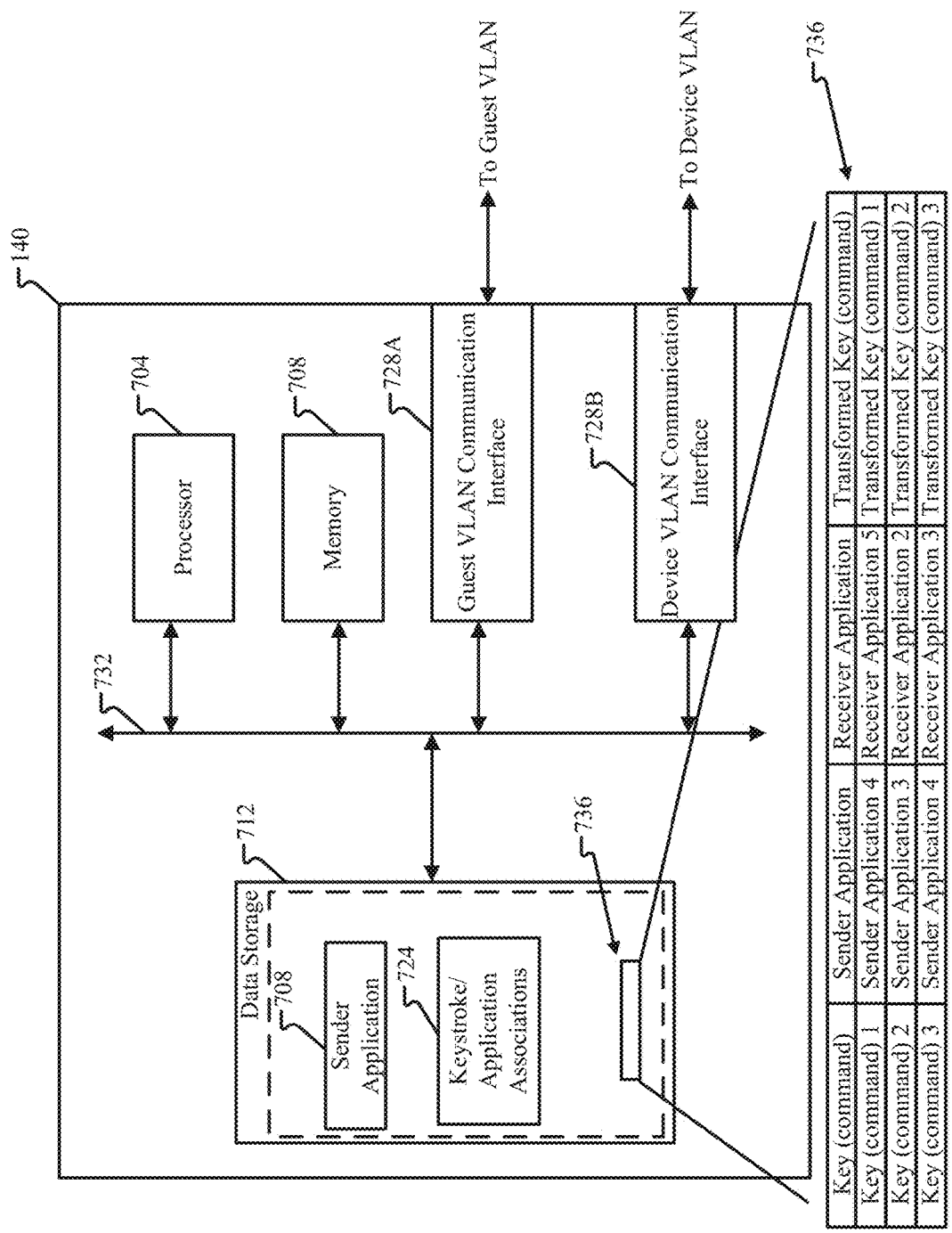
FIG. 7 depicts aspects of a system network controller (SNC) in accordance with embodiments of the present disclosure.

FIG. 7 is a block diagram illustrating components of a system network controller (SNC) 140 in accordance with embodiments of the present disclosure. In general, the SNC 140 includes a processor 704 and memory 708. The processor 704 may comprise a general purpose programmable processor or controller for executing application programming or instructions. As a further example, the processor 704 may comprise a specially configured application specific integrated circuit (ASIC). The processor 704 generally functions to run programming code or instructions, such as applications or programs, implementing various functions of the SNC 140. The memory 708 is generally used in connection with the execution of application programming by the processor 704 and for the temporary or long-term storage of program instructions and/or data. As examples, the memory 708 may comprise removable secure digital storage, RAM, SDRAM, or other solid-state memory.

The SNC 140 can also include data storage 712. In accordance with embodiments of the present invention, data storage 712 can contain program code or instructions implementing various applications or functions executed by the SNC server 140. Like the memory 708, the data storage 712 can comprise a solid-state memory device. In addition, in certain applications, the data storage 712 can be integrated with and/or indistinguishable from the memory 708. Alternatively, or in addition, the data storage 712 may comprise a hard disk drive or other random-access memory and/or can be interconnected to the SNC server 140, for example as network-attached storage. Programming or modules 716 stored in the data storage 712 and executed by the processor 704 can include, as examples and without limitation, one or more sender applications 720, and one or more keystroke/application associations 724. The one or more keystroke/application associations 724 may associate a keystroke to an application. For example, a table 736, or other data association structure, may include the originating key command, (or a key command received from a keystroke router), an identifier of the sending application, an identifier of a receiver application, and one or more transformed keys. Of course additional fields may be included in the table 736. The sender application 720 may allow the SNC 140 to direct the local player 124 to a specified location, such as a URL. Further, the SNC 140 sender application 720 may receive the keystroke from the keystroke router 152 and interact with a receiver application located at an application server 144 for example. Thus, the keystroke/application association 724 including instructions and associations ensure that a change associated with a keystroke received from a keystroke router 152 is reflected at the local player 112 and ultimately the output device 108.

The SNC server 140 may also include one or more communication interfaces 728A-B. For example, a first communication interface 728A may provide a connection to the first communication network 132 while a second communication interface 728B may provide a connection to a device virtual local area network (VLAN), such as one or more VLANs in which the local player 124 resides. One or more components fo the SNC server 140 may be coupled to one another via the bus 732.

In accordance with some embodiments, the value of the key received from the remote-control device may be changed. For example, an SNC 140 may receive a first key value from the remote-control device 108, output device 112, keystroke router 152, and/or keystroke detector 106/204 and change the value of the key so that the application executing on the local player 124 correctly registers the value, or meaning, of the received key. For example, if a remote control 108 has an INFO button, the key representative of the INFO button may change from a first value/character to a second value/character, such as a "?" or other character so that the key can be natively digested by an app. An up arrow may still be the equivalent of an up arrow, but might have a different representation code.

In accordance with an embodiment of the present disclosure, a method for routing key commands received from a remote-control device is provided. The method may include receiving, at a device, a key command from the remote-control device, generating a first message that includes the key command, sending, from the device, the first message to a keystroke router, and determining, at the keystroke router, a system network controller associated with the device. Moreover, the keystroke router may send the key command to the system network controller.

At least one aspect of the above embodiment may include where the keystroke router sends the key command to the system network controller. An additional aspect may include where the first message is communicated across a broadband local area network. At least one aspect of the above embodiment may include where the key command sent from the keystroke router to the system network controller is sent in a second message. An additional aspect of the may include where determining a system network controller associated with the device is based on one or more of information included in the first message and an association between the device and the determined system network controller. At least one aspect of the above embodiment may include providing, by the system network controller, a second message indicative of the key command received from the remote-control device, to an application associated with a local player. Yet, another aspect may include where the device is a keystroke detector. At least one aspect of the above embodiment may include providing, by the system network controller, a second message indicative of the key command received at the device, to an application associated with a local player. An additional aspect of the may include displaying, at an output device associated with the local player, an action indicative of the key command received at the device. At least one aspect of the above embodiment may include displaying, at the device, an action indicative of the key command received at the device.

In accordance with an embodiment of the present disclosure, a communication system is provided. The communication system may include a local player, an output device configured to receive a key command from a remote-control device and to generate a first message that includes the key command, and a keystroke router configured to receive the first message from the output device, determine a system network controller associated with the output device, and send the key command to the system network controller.

In accordance with at least one aspect of the above embodiment, the first message is communicated across a broadband local area network. In accordance with another aspect of the above embodiment, the system network controller is configured to receive the key command in a second message. Further still, the system network controller is configured to provide a second message indicative of the key command received from the remote-control device to an application associated with the local player. Moreover, the output device is configured to display an action indicative of the key command received at the device. In accordance with at least one aspect of the above embodiment, the keystroke router is configured to determine the system network controller associated with the output device based on one or more of information included in the first message and an association between the output device and the determined system network controller.

In accordance with an embodiment of the present disclosure, a communication system is provided. The communication system may include a local player, a device configured to receive a key command from a remote-control device and to generate a first message that includes the key command, and a keystroke router configured to receive the first message from the output device, determine a system network controller associated with the output device, and send the key command to the system network controller.

In accordance with at least one aspect of the above embodiment, the communication system may include an output device configured to display an action indicative of the key command received at the device. Further, the first message may be communicated across a broadband local area network. In accordance with at least one aspect, the system network controller is configured to provide a second message indicative of the key command received from the remote-control device to an application associated with the local player. At least one aspect includes where the keystroke router is configured to determine the system network controller associated with the device based on one or more of information included in the first message and an association between the output device and the determined system network controller.

Accordingly, the present invention has been described with some degree of particularity directed to the exemplary embodiments of the present invention. It should however be appreciated that modifications or changes may be made to the exemplary embodiments of the present invention without departing from the inventive concepts contained herein.

What is claimed is:

1. A method for routing key commands received from a remote-control device, the method comprising:
   receiving, at a local player, a key command from the remote-control device, wherein the key command comprises an encoded signal;
   the local player determining whether the encoded signal controls a function of at least one of the local player or an output device connected to the local player; and
   upon the local player determining that the encoded signal does not control a function of at least one of the local player or the output device, the local player:
      generating a first message that comprises the encoded signal, wherein the first message is encoded for transmission on a network;
      sending the first message to a system network controller; and
      causing a function, mapped to the encoded signal, to be executed by an application server.

2. The method of claim 1, wherein the network is a broadband local area network.

3. The method of claim 1, wherein the key command is sent from a keystroke router to the system network controller in a second message.

4. The method of claim 1, wherein the system network controller associated with the output device is selected from a plurality of system network controllers based on one or more of information included in the first message and an association between the output device and the selected system network controller.

5. The method of claim 1, further comprising:
   providing, by the system network controller, a second message indicative of the key command received from the remote-control device, to an application associated with the local player.

6. The method of claim 1, wherein the output device comprises a keystroke detector.

7. The method of claim 1, further comprising:
   providing, by the system network controller, a second message indicative of the key command received at the local player, to an application associated with the local player.

8. The method of claim 7, further comprising:
   displaying, at the output device associated with the local player, an action indicative of the key command received at the local player.

9. The method of claim 1, further comprising, displaying, at the local device, an output of function of the application server.

10. A communication system, comprising:
   a local player;
   the local player configured to receive a key command from a remote-control device, wherein the key command comprises an encoded signal;
   the local player determines whether the encoded signal controls a function of at least one of the local player or an output device connected to the local player;
   upon the local player determining that the encoded signal does not control a function of the at least one of the local player or an output device connected to the local player, the local player further generates a first message that comprises the encoded signal, wherein the first message is encoded for transmission on a network and the local player further sends the first message to a system network controller associated with the output device of a plurality of system network controllers; and
   an application server executes a function mapped to the encoded signal.

11. The communication system of claim 10, wherein the first message is communicated across the network comprising a broadband local area network.

12. The communication system of claim 10, wherein the system network controller is configured to receive the key command in a second message.

13. The communication system of claim 12, wherein the system network controller is configured to provide a second message indicative of the key command received from the remote-control device to an application associated with the local player.

14. The communication system of claim 13, wherein the output device is configured to display an action indicative of the key command received at the device.

15. The communication system of claim 10, wherein a keystroke router is configured to determine the system network controller that is associated with the output device based on one or more of information included in the first message and an association between the output device and the determined system network controller.

16. A communication system, comprising:
   a local player;
   a device configured to receive a key command from a remote-control device, wherein the key command comprises an encoded signal, wherein the device determines whether the encoded signal controls a function of at least a local player or an output device connected to the local player; and
   the local player is configured to, upon determining the encoded signal does not control a function of at least one of the local player or the output device:
      generate a first message that comprises the encoded signal, wherein the first message is encoded for transmission on a network; and
      send the first message to a system network controller; and
   an application server to execute a function mapped to the encoded signal.

17. The communication system of claim 16, wherein the output device is configured to display an action indicative of the key command received at the device.

18. The communication system of claim 17, wherein the first message is communicated across the network comprising a broadband local area network.

19. The communication system of claim 17, wherein the system network controller is configured to provide a second message indicative of the key command received from the remote-control device to an application associated with the local player.

20. The communication system of claim 17, wherein a keystroke router is configured to determine the system network controller associated with the device based on one or more of information included in the first message and an association between the output device and the determined system network controller.

* * * * *